United States Patent
Hillard et al.

(10) Patent No.: US 11,762,095 B2
(45) Date of Patent: Sep. 19, 2023

(54) LIDAR SYSTEM AND METHOD OF OPERATION

(71) Applicant: Red Leader Technologies, Inc., Palo Alto, CA (US)

(72) Inventors: Jacob Hillard, Palo Alto, CA (US); Christopher Baca, Palo Alto, CA (US)

(73) Assignee: Red Leader Technologies, Inc., Mountain View, CA (US)

( * ) Notice: Subject to any disclaimer, the term of this patent is extended or adjusted under 35 U.S.C. 154(b) by 0 days.

(21) Appl. No.: 18/104,632

(22) Filed: Feb. 1, 2023

(65) Prior Publication Data
US 2023/0243972 A1 Aug. 3, 2023

Related U.S. Application Data

(60) Provisional application No. 63/423,959, filed on Nov. 9, 2022, provisional application No. 63/305,338, filed on Feb. 1, 2022.

(51) Int. Cl.
*G01S 17/89* (2020.01)
*G01S 7/4915* (2020.01)
*G01S 17/36* (2006.01)

(52) U.S. Cl.
CPC .......... *G01S 17/89* (2013.01); *G01S 7/4915* (2013.01); *G01S 17/36* (2013.01)

(58) Field of Classification Search
None
See application file for complete search history.

(56) References Cited

U.S. PATENT DOCUMENTS

| | | |
|---|---|---|
| 5,532,697 A | 7/1996 | Hidaka et al. |
| 6,031,601 A | 2/2000 | McCusker et al. |
| 7,532,311 B2 | 5/2009 | Henderson et al. |
| 7,642,963 B2 | 1/2010 | Apostolos et al. |
| 8,072,582 B2 | 12/2011 | Meneely |
| 8,605,261 B2 | 12/2013 | Rindle |
| 9,097,646 B1 | 8/2015 | Campbell et al. |

(Continued)

FOREIGN PATENT DOCUMENTS

| | | |
|---|---|---|
| CN | 103616696 A | 3/2014 |
| CN | 107015230 B | 12/2019 |

(Continued)

OTHER PUBLICATIONS

Ke, Pinhui, et al., "A Generic Constructions of Z-Periodic Complementary Sequence Sets with Flexible Flock Size and Zero Correlation Zone Length", IEEE Signal Processing Letters, vol. 22, No. 9, Sep. 2015.

(Continued)

*Primary Examiner* — Luke D Ratcliffe
(74) *Attorney, Agent, or Firm* — Jeffrey Schox; Samuel Rosenthal

(57) ABSTRACT

A method of lidar system operation, preferably including: determining a signal, outputting the signal, receiving a return signal, and/or analyzing the return signal. A lidar system, preferably including one or more: optical emitters, optical detectors, beam directors, and/or processing modules. A class of spectrally decimated encodings, wherein multiple codes of this class, all preferably mutually spectrally-orthogonal, can be generated based on a single input encoding.

20 Claims, 10 Drawing Sheets

(56) References Cited

U.S. PATENT DOCUMENTS

| | | |
|---|---|---|
| 9,684,076 B1 | 6/2017 | Feldkhun |
| 9,759,810 B1 | 9/2017 | Sankar |
| 10,267,898 B2 | 4/2019 | Campbell et al. |
| 10,488,492 B2 | 11/2019 | Hamel et al. |
| 10,502,833 B2 | 12/2019 | Sebastian |
| 10,527,727 B2 | 1/2020 | Bondy et al. |
| 10,591,604 B2 | 3/2020 | Xu |
| 10,845,470 B2 | 11/2020 | Verghese et al. |
| 10,928,485 B1 | 2/2021 | Karadeniz et al. |
| 10,969,475 B2 | 4/2021 | Li et al. |
| 11,054,508 B2 | 7/2021 | Li et al. |
| 11,204,420 B2 | 12/2021 | Kubota et al. |
| 2004/0105087 A1 | 6/2004 | Gogolla et al. |
| 2006/0227317 A1 | 10/2006 | Henderson et al. |
| 2009/0195454 A1 | 8/2009 | Apostolos et al. |
| 2010/0045965 A1 | 2/2010 | Meneely |
| 2012/0281200 A1 | 11/2012 | Rindle |
| 2013/0116977 A1 | 5/2013 | Godbaz et al. |
| 2013/0258312 A1 | 10/2013 | Lewis |
| 2015/0304534 A1* | 10/2015 | Kadambi ............... H04N 23/56 348/207.11 |
| 2016/0154104 A1 | 6/2016 | Schumann et al. |
| 2016/0259038 A1 | 9/2016 | Retterath et al. |
| 2016/0266246 A1 | 9/2016 | Hjelmstad |
| 2017/0307726 A1 | 10/2017 | Mazzaro et al. |
| 2018/0188358 A1* | 7/2018 | Li ........................ G01S 7/484 |
| 2018/0188368 A1 | 7/2018 | Zuffada et al. |
| 2018/0224535 A1 | 8/2018 | Sankar |
| 2018/0259645 A1 | 9/2018 | Shu et al. |
| 2018/0267169 A1 | 9/2018 | Xu |
| 2018/0275249 A1 | 9/2018 | Campbell et al. |
| 2018/0292534 A1 | 10/2018 | Field |
| 2018/0299554 A1 | 10/2018 | Van Dyck et al. |
| 2018/0373260 A1 | 12/2018 | Lipson et al. |
| 2019/0056497 A1 | 2/2019 | Pacala et al. |
| 2019/0086531 A1 | 3/2019 | Rick |
| 2019/0179018 A1 | 6/2019 | Gunnam et al. |
| 2019/0353787 A1 | 11/2019 | Petit |
| 2020/0132847 A1* | 4/2020 | Hillard ................. G01S 7/4865 |
| 2020/0132848 A1* | 4/2020 | Hillard ................. G01S 7/4817 |
| 2021/0072381 A1 | 3/2021 | Crouch et al. |
| 2022/0113422 A1 | 4/2022 | Hillard et al. |

FOREIGN PATENT DOCUMENTS

| | | |
|---|---|---|
| CN | 111474553 A | 7/2020 |
| DE | 102012112985 B3 | 12/2013 |
| DE | 102016222138 A1 | 5/2018 |
| JP | 2018009829 A | 1/2018 |
| WO | 2010040924 A1 | 4/2010 |
| WO | 2018050906 A2 | 3/2018 |
| WO | 2020086903 A1 | 4/2020 |
| WO | 2020086906 A1 | 4/2020 |

OTHER PUBLICATIONS

Li, Zonglei, et al., "Hybrid Golay-coded Brillouin optical time-domain analysis based on differential pulses", Optics Letters, vol. 43, No. 19 / Oct. 1, 2018.

Liu, Zilong, et al., "Correlation and Set Size Bounds of Complementary Sequences with Low Correlation Zone", IEEE Transactions on Communications, Dec. 2011.

Mienkina, Martin P., et al., "Experimental Evaluation of Photoacoustic Coded Excitation Using Unipolar Golay Codes", IEEE Transactions on Ultrasonics, Ferroelectrics, and Frequency Control, vol. 57, No. 7, Jul. 2010.

Trots, I., et al., "Golay sequences—Side-lobe—Canceling codes for ultrasonography", Archives of Acoustics 29, I, 87-97 (2004).

Trots, Ihor, "Mutually Orthogonal Golay Complementary Sequences in Synthetic Aperture Imaging Systems", Archives of Acoustics, vol. 40, No. 2, pp. 283-289 (2015).

* cited by examiner

| σ index | X index | decimation order | notes |
|---|---|---|---|
| 0 | 0-3 | 0-3 | zero-value |
| 1 | 4 | 0 | |
| 1 | 5 | 1 | |
| 1 | 6 | 2 | |
| 1 | 7 | 3 | |
| ⋮ | ⋮ | ⋮ | |
| 255 | 1020 | 0 | |
| 255 | 1021 | 1 | |
| 255 | 1022 | 2 | |
| 255 | 1023 | 3 | |
| 256 | 1024 | 0-3 | zero-value |
| 257 | 1025 | 3 | |
| 257 | 1026 | 2 | |
| 257 | 1027 | 1 | |
| 257 | 1028 | 0 | |
| ⋮ | ⋮ | ⋮ | |
| 510 | 2037 | 3 | |
| 510 | 2038 | 2 | |
| 510 | 2039 | 1 | |
| 510 | 2040 | 0 | |
| 511 | 2041 | 3 | |
| 511 | 2042 | 2 | |
| 511 | 2043 | 1 | |
| 511 | 2044 | 0 | |
| n/a | 2045-2047 | n/a | zero-value |

FIGURE 4A

LIDAR SYSTEM AND METHOD OF OPERATION

CROSS-REFERENCE TO RELATED APPLICATIONS

This application claims the benefit of U.S. Provisional Application Ser. No. 63/305,338, filed on 1 Feb. 2022, and of U.S. Provisional Application Ser. No. 63/423,959, filed on 9 Nov. 2022, each of which is incorporated in its entirety by this reference.

TECHNICAL FIELD

This invention relates generally to the object detection and/or imaging field, and more specifically to a new and useful lidar system and method of operation in the object detection and/or imaging field.

BRIEF DESCRIPTION OF THE FIGURES

FIG. 4A is a schematic representation of an example of frequency bin mappings for spectral decimation.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1A:
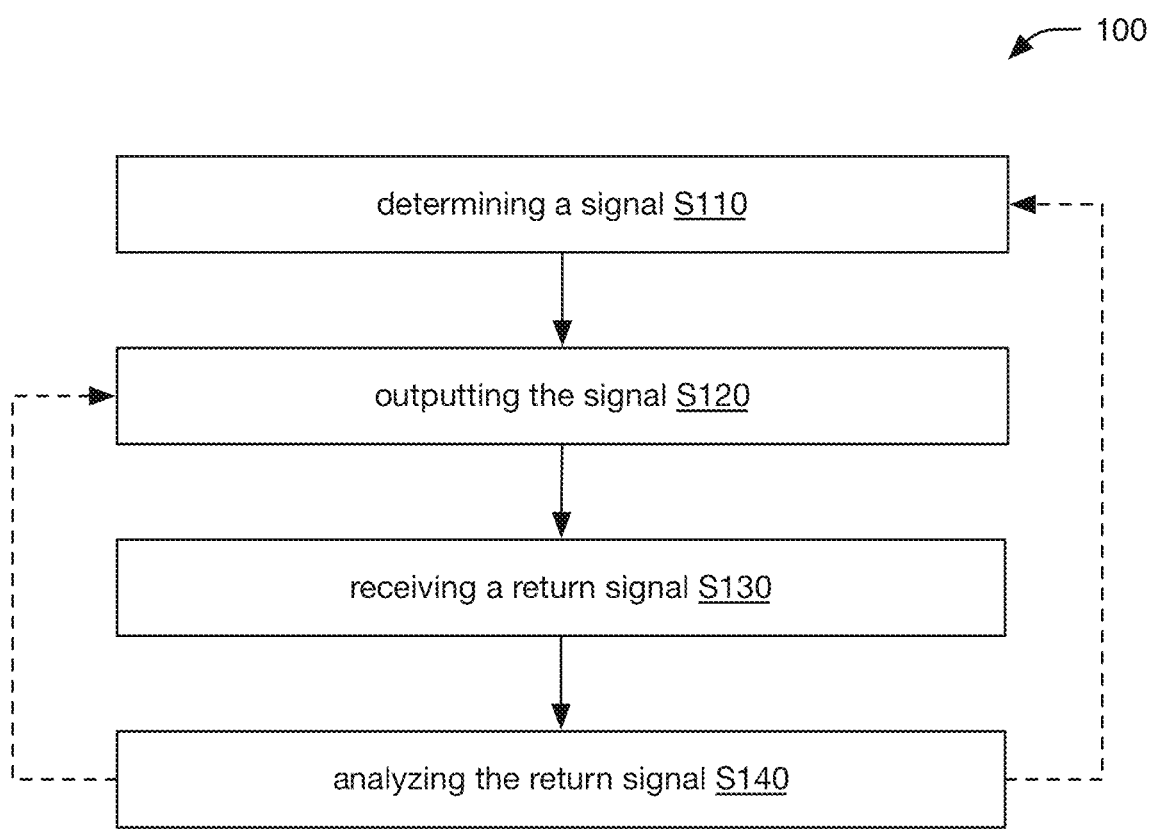
FIGS. 1A-1B are flowchart representations of an embodiment of the method and an example of the embodiment, respectively.
Figure 1B:
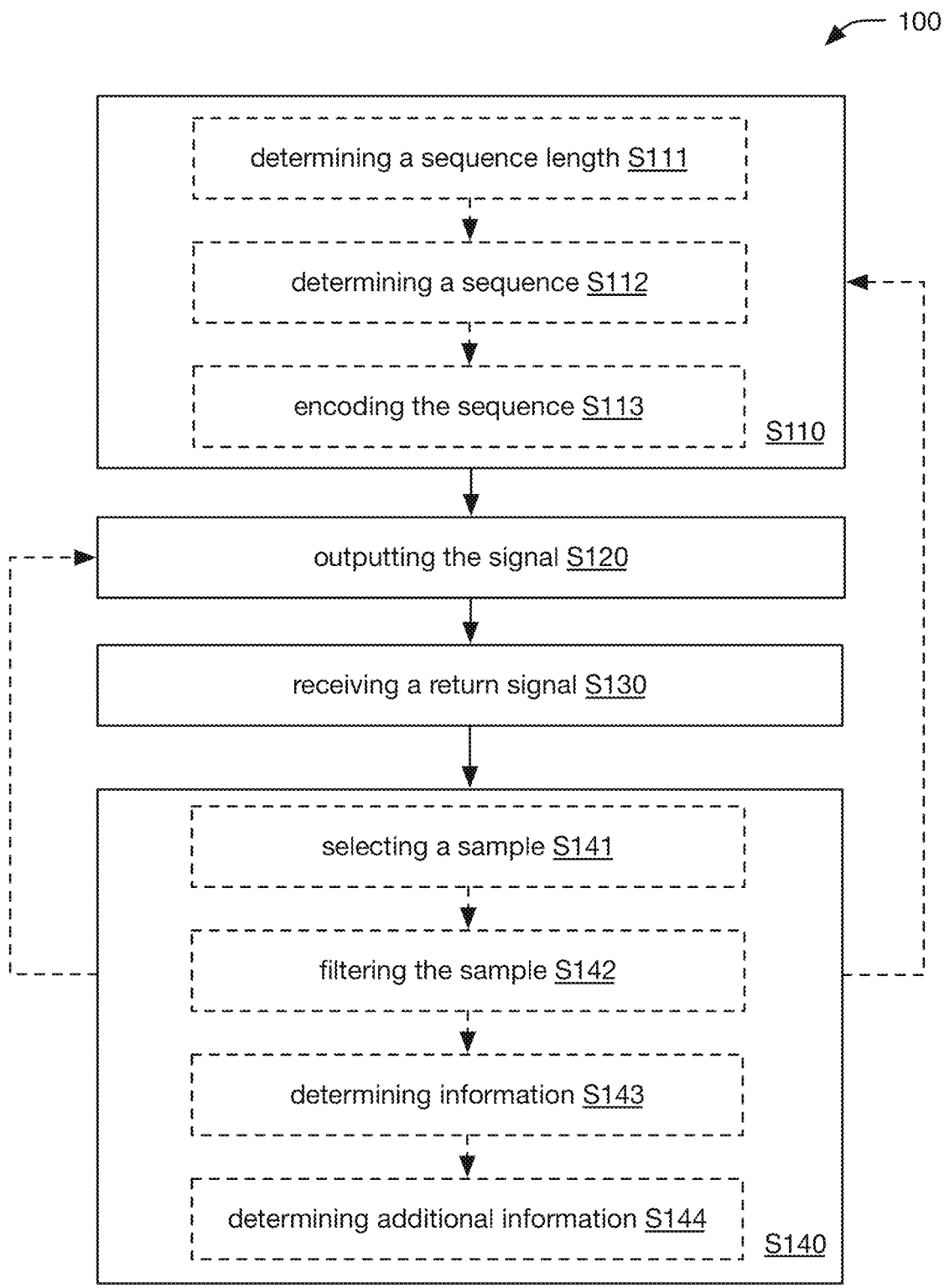

A method 100 of lidar system operation preferably includes: determining a signal S110; outputting the signal S120; receiving a return signal S130; and/or analyzing the return signal S140 (e.g., as shown in FIGS. 1A-1B). However, the method 100 can additionally or alternatively include any other suitable elements performed in any suitable manner. The method 100 is preferably performed using a lidar system 200, but can additionally or alternatively be performed using any other suitable system(s).

Many lidar systems and methods characterize distances to objects in their surroundings based on time delays (e.g., associated with pulses of light emitted by the systems); their performance is often significantly limited (e.g., in terms of range, resolution, accuracy, etc.), such as due to a need to wait for each light pulse to return before emitting the next light pulse. In contrast, embodiments of the method 100 and/or lidar system 200 described herein use phase delays (e.g., of encoded light signals, such as periodic signals, emitted by the lidar system 200, such as described below in more detail) to characterize distances to (and/or other information associated with) objects in their surroundings. As these phase delays depend on distance (e.g., and are used to characterize a potentially unknown and/or changing arrangement of objects), the encodings used are typically asynchronous. Accordingly, a class of encodings exhibiting spectral orthogonality, invariant (or substantially invariant) under phase shifts, consistent with this application, is described herein.

2. Benefits.

Variants of the technology (e.g., the method 100 and/or lidar system 200) can confer one or more benefits.

First, in some variants, encodings (e.g., spectrally-decimated encodings) generated and/or used in the manner described herein can include spectral components spanning (e.g., densely spanning, such as having non-zero components distributed substantially evenly throughout) a large portion (e.g., all or substantially all) of an available or used spectral range. For example, some such encodings can span large spectral ranges much more completely than encodings associated with typical OFDM approaches, which can improve overall performance of the technology (e.g., resulting in reduced peak distortion and/or other beneficial effects).

Second, in some variants, encodings (e.g., spectrally-decimated encodings) generated and/or used in the manner described herein can enable significant efficiencies and/or simplifications of frequency-domain storage and/or computation. As spectrally-decimated encodings will typically include a large number of zero-value frequency bins, typically a known pattern for zero-value and non-zero-value bins, frequency domain representations of many such encodings can be stored efficiently (e.g., by storing only the non-zero values along with an indication of which known pattern these non-zero values correspond to); additionally or alternatively, computations using such frequency domain representations can be performed using only the indices corresponding to non-zero values of the encoding in question, thereby reducing the number of elements involved in the computation (e.g., by a factor equal or substantially equal to the degree of spectral decimation).

However, variants of the technology can additionally or alternatively confer any other suitable benefits, and/or can confer no such benefits.

3. System.

Figure 2A:
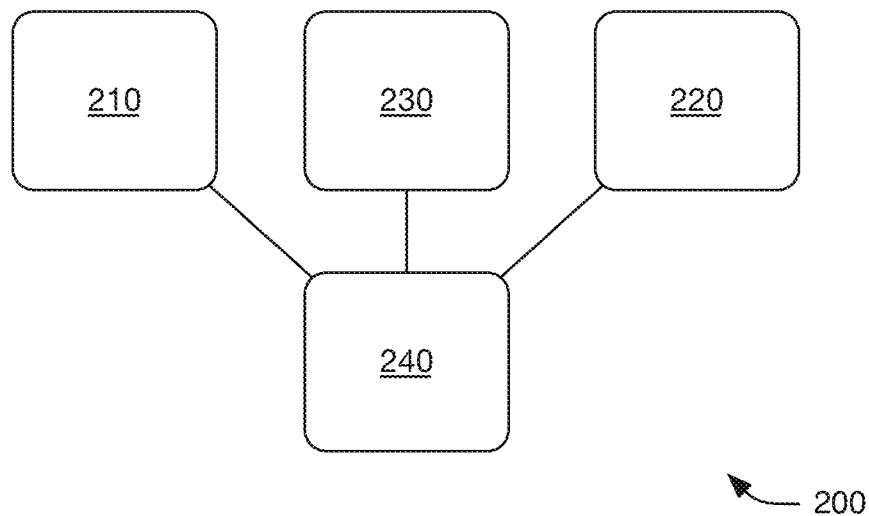
FIG. 2A is a schematic representation of an embodiment of the system.
Figure 2B:
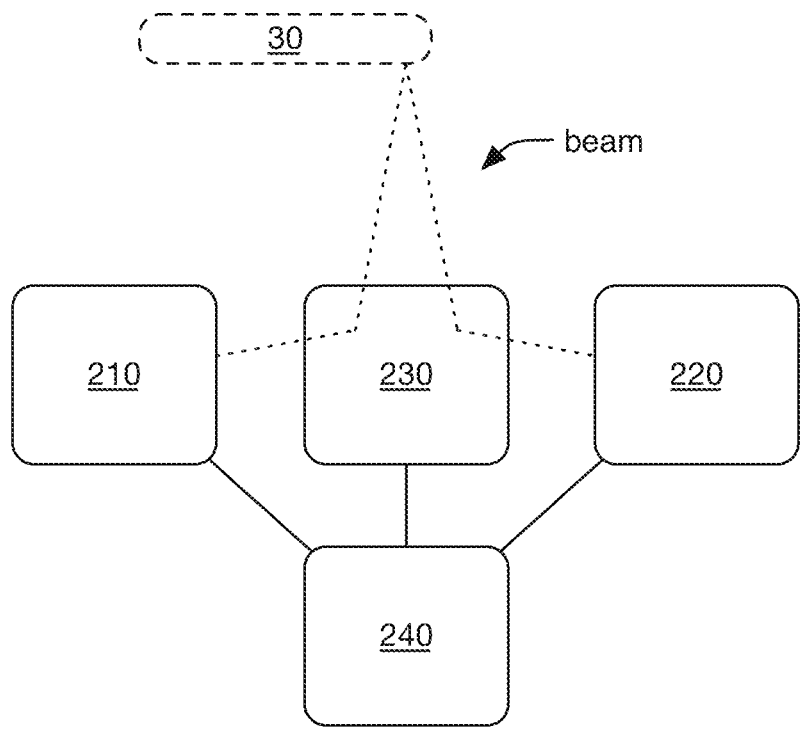
FIG. 2B is a schematic representation of the embodiment of the system in use.

The lidar system 200 preferably includes one or more: optical emitters 210; optical detectors 220; beam directors 230; and/or processing modules 240 (e.g., as shown in FIGS. 2A-2B). The LIDAR system preferably includes one or more elements such as described in U.S. patent application Ser. No. 17/500,113, filed 13 Oct. 2021 and titled "LIDAR SYSTEM AND METHOD OF OPERATION", which is incorporated herein in its entirety by this reference (e.g., includes the entire 'lidar system 200' described therein). The system 200 is preferably operable and/or configured to perform the method 100 described herein, but can additionally or alternatively have any other suitable functionality and/or be configured in any other suitable manner.

The optical emitter(s) 210 (e.g., lasers) preferably function to (e.g., are operable to) emit one or more optical signals. The optical signals are preferably beam-like (e.g., laser beams), but can additionally or alternatively have any other suitable optical characteristics.

The optical emitters preferably include one or more lasers (e.g., diode lasers). The lasers can include, for example, edge-emitting lasers, surface-emitting lasers (e.g., VCSELs), fiber coupled lasers, and/or lasers of any other suitable types. The lasers are preferably continuous wave lasers (e.g., operable and/or configured to emit substantially continuous wave radiation) but can additionally or alternatively include pulsed lasers (e.g., operable and/or configured to emit pulses of radiation) and/or any other suitable lasers. In one specific example, one or more of the lasers emit light with a wavelength of substantially 900 nm (e.g., 890-910 nm, 875-925 nm, etc.). In a second specific example, one or more of the lasers emit light with a wavelength of substantially 1550 nm (e.g., 1540-1560 nm, 1525-1575 nm, etc.). In a third specific example, one or more of the lasers emit light with a wavelength of substantially 835 nm (e.g., 820-850 nm, 800-870 nm, etc.). The light intensity emitted by the laser is preferably lower than or equal to the limit prescribed by regulatory standards (e.g., the laser can be compliant with IEC-60825, IEC-62471, etc.), but can alternatively be higher. The signal power can be within regulatory limits (e.g., less than a threshold power, such as 5 W 2 W, 1 W, 500 mW, 200 mW, 100 mW, 50 mW, 20 mW, 10 mW, 5 mW, 2 mW, 1 mW, 0.5 mW, 0.2 mW, or 0.1 mW, etc.), preferably less than 1 mW, but can alternatively be higher or lower. However, the lasers can additionally or alternatively include any other suitable lasers.

Each optical emitter 210 preferably includes one or more modulators. Each modulator is preferably operable to modulate one or more aspects (e.g., phase, intensity, wavelength, etc.) of the light emitted by the emitter. However, the system 200 can additionally or alternatively include any other suitable optical emitters.

The optical detector(s) 220 preferably function to (e.g., are operable to) generate an electrical signal (e.g., current, voltage, etc.) in response to optical detection (e.g., representative of the detected optical signal), but can additionally or alternatively generate any other suitable signal (e.g., representative of the detected optical signal) in response to optical signal detection. For example, the optical detectors can include one or more photodiodes (e.g., avalanche photodiodes). The optical detector(s) 220 can optionally include (and/or be supplemented by) one or more demodulators (e.g., digital demodulators, such as computationally-implemented demodulators; analog demodulator circuits; etc.), such as demodulators complementary to the modulators (e.g., configured to convert the encoded signal back into the original sequence). However, the system 200 can additionally or alternatively include any other suitable optical detectors.

The beam director(s) 230 preferably functions to direct the optical signal(s) between aspects of the system 200 and the external environment. For example, a beam director 230 can direct an emitted optical signal (e.g., beam) from an optical emitter 210 to an external location 30 (within the external environment), wherein the optical signal reflects off the external location 30 (and/or other external locations). The optical signal is preferably reflected back to the beam director 230, which directs the reflected signal to an optical detector 220. However, the optical signal can additionally or alternatively be reflected to another beam director 230 (e.g., which directs the signal to the optical detector 220), to the optical detector 220, and/or to any other suitable element(s) of the system 200. Each beam director 230 can direct one or more emitted signal and one or more reflected signals, and can direct the signals between one or more optical emitters 210, external locations 30, and/or optical detectors 220 (e.g., as shown in FIG. 2B). In one example, the beam director 230 includes one or more mirrors, preferably moving and/or moveable mirrors such as rotating mirrors (e.g., continuously rotating) and/or MEMS-based mirrors (e.g., configured to move in response to control inputs), which can direct the optical signal to many external locations 30 over time (e.g., scanning the beam over the locations as the mirror rotates). However, the system 200 can additionally or alternatively include any other suitable beam directors, or include no beam director.

The processing module(s) 240 preferably function to: control other elements of the system 200, such as the optical emitters 210 (e.g., controlling optical emission and/or modulation) and/or beam directors 230 (e.g., controlling the direction of the beam); receive data from other elements of the system 200, such as the optical detectors 220 (e.g., receiving signals associated with light detection); and/or process (e.g., interpret) the received data, such as to determine information about the external environment (e.g., positions of the external locations 30). The processing module 240 is preferably communicatively (e.g. electronically) coupled to the optical emitters 210, optical detectors 220, beam directors 230, and/or any other suitable elements of the system. The processing module 240 preferably includes one or more processors (e.g., CPU, GPU, microprocessor, FPGA, ASIC, etc.) and/or storage units (e.g., Flash, RAM, etc.), but can additionally or alternatively include any other suitable elements. In some variations, the processing module 240 (and/or a supplementary processing module) can be physically separated from the other elements of the lidar system (e.g., wherein the lidar system includes a communication module, such as a wireless communication module, configured to communicate with the processing module). For example, the processing module 240 can be a remote computing system (e.g., Internet-connected server), and the lidar system can communicate with the remote computing system (e.g., wherein some or all computations of the method are performed by the remote computing system). However, the system 200 can additionally or alternatively include any other suitable processing modules.

In some embodiments, the lidar system 200 includes one or more elements such as described in U.S. patent application Ser. No. 17/500,113, filed 13 Oct. 2021 and titled "LIDAR SYSTEM AND METHOD OF OPERATION", in U.S. patent application Ser. No. 16/663,142, filed 24 Oct. 2019 and titled "LIDAR SYSTEM AND METHOD OF OPERATION", and/or in U.S. patent application Ser. No. 16/663,249, filed 24 Oct. 2019 and titled "LIDAR SYSTEM AND METHOD OF OPERATION", each of which is herein incorporated in its entirety by this reference; for example, the lidar system 200 can include the entire 'lidar system 200' of U.S. patent application Ser. No. 17/500,113, the entire 'lidar system 200' of U.S. patent application Ser. No. 16/663,142, the entire 'lidar system 10' of U.S. patent application Ser. No. 16/663,249, a subset of one or more of the three, and/or any other suitable combination of elements and/or functionalities of the three or any subset thereof. However, the system 200 can additionally or alternatively include any other suitable elements in any suitable arrangement.

4. Encodings.

Signals can be encoded in many different ways. Herein, we describe a class of spectrally decimated codes, wherein multiple codes of this class, all mutually spectrally-orthogonal (e.g., wherein, for any pair of spectrally-orthogonal codes, the corresponding discrete spectra have no overlap in their support), can be generated based on a single input encoding (e.g., wherein the input encoding is not spectrally decimated). Further, we describe a process for generating such spectrally decimated codes.

The spectrally decimated codes can be characterized based on the code length N and the degree d of spectral decimation, wherein the degree of spectral decimation is equal to the number of spectrally-orthogonal codes that can be generated by the spectral decimation process.

To generate a set of d (or alternatively, fewer than d) spectrally-orthogonal codes of length N via d-fold spectral decimation, an input encoding of length N/d is used. For example, to generate a set of four spectrally-orthogonal codes, each of length N=2048, a 4-fold spectral decimation can be performed on an input encoding of length N/d=512. The input encoding preferably exhibits low auto-correlation sidelobes (e.g., low auto-correlation for non-zero phase offsets, such as all non-zero phase offsets), but can alternatively have any other suitable properties.

A discrete Fourier transform (e.g., fast Fourier transform (FFT)) of the input encoding is performed to generate a frequency domain representation of the input encoding. The frequency domain representation will include N/d frequency bins, which are referred to herein by a σ index between 0 and N/d−1. This input frequency representation preferably includes a zero-value for the DC component (σ=0) and Nyquist frequency (σ=N/2d): a non-zero DC component value could preclude the desired auto-correlation behavior (e.g., as the DC component will contribute to auto-correlation at all phase offsets), and a non-zero Nyquist frequency value could preclude the desired cross-correlation behavior (e.g., as the Nyquist frequency σ index is typically mapped only to a single X index, and thus is shared by all the spectrally decimated codes generated from the input encoding, it must be zero for the spectrally decimated codes to be spectrally-orthogonal). In examples in which the FFT produces a spectrum with non-zero values in one or more of these frequency bins (e.g., the DC bin and/or Nyquist frequency bin), the frequency bins are preferably changed to a value of zero in preparation for performing spectral decimation.

To perform d-fold spectral decimation of this input spectrum (e.g., the spectrum resulting from FFT of the input encoding), up to d separate spectrally decimated encodings can be generated (e.g., wherein the resulting set of spectrally-orthogonal encodings can include d or fewer encodings, meaning the set has a cardinality less than or equal to d), each of which can be referred to by a respective decimation order s. Here, the decimation order indicates the order in which the input frequency bins are mapped onto spectrally-orthogonal frequency bins of the resulting encoding, where the decimation order is equal to the number of frequency bins skipped for mapping the σ=0 bin of the input spectrum. Generating the spectrally-orthogonal encodings preferably includes performing the spectral decimation for each of the decimation orders, such as described below.

For a given decimation order s, generating the associated spectrally decimated code preferably includes performing zero-padding, more preferably by inserting d−1 zero-value frequency bins adjacent to every frequency bin of the input spectrum (except the Nyquist frequency σ=N/2d, for which d−1 zero-value frequency bins are instead preferably inserted into the highest-index frequency bins of the spectrum, but additionally or alternatively can include inserting any suitable number frequency bins, preferably zero-value frequency bins, in any other suitable location(s) within the spectrum, or can include inserting no such frequency bins), thereby converting the input spectrum having N/d frequency bins into a spectrally decimated spectrum having approximately N frequency bins (e.g., having N−d+1 frequency bins, having exactly N frequency bins, etc.). In some cases, it may be more convenient to denote the number of frequency bins of the input spectrum as n, and so the number of frequency bins in the resulting spectrally decimated spectra is denoted as approximately nd, such as greater than or equal to nd−d+1; as d is an integer greater than 1, in these circumstances, the minimum value of the expression nd−d+1 arises for d=2, in which case nd−d+1=2n−1. The input frequency bins are preferably mapped to frequency bins of the spectrally decimated code (wherein these frequency bins can be denoted by an X index), such as wherein:

$$X = \begin{cases} \sigma d + s, & \sigma < N/2d \\ N/2, & \sigma = N/2d \\ \sigma d - s, & \sigma > N/2d \end{cases}$$

For each spectrally-decimated encoding, there preferably exists a bijective mapping from the input frequency bins of non-zero value to the spectrally-decimated encoding frequency bins of non-zero value; equivalently, there preferably exists a bijective mapping from the input frequency bins to a first subset of the spectrally-decimated encoding frequency bins, wherein all spectrally-decimated encoding frequency bins that do not belong to the first subset have zero amplitude (however, the spectrally-decimated encoding frequency bins can additionally or alternatively include non-zero amplitude frequency bins outside the first subset).

Figure 4B:
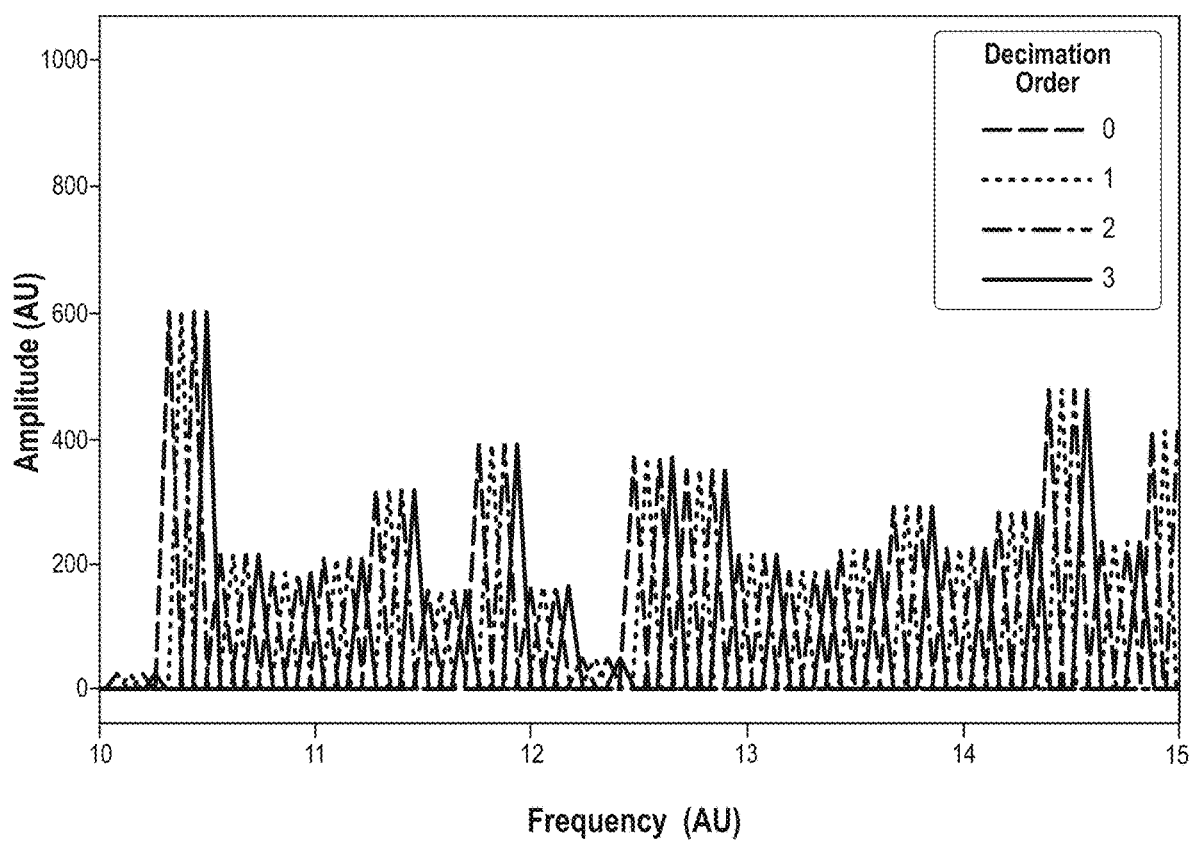
FIG. 4B is a chart representation of a specific example of decimated spectra.

An example of frequency bin mappings for 4-fold spectral decimation of an input encoding of length 512 (resulting in four spectrally-orthogonal encodings of length 2048) is shown in FIG. 4A. In this figure, the frequency bins of the original encoding (denoted by the σ index) are mapped onto different frequency bins for spectrally-decimated encodings (denoted by the X index). Here, the decimation order indicates the order in which the original encoding frequency bins are mapped onto the spectrally-orthogonal bins. Note that each of the four separate spectrally-orthogonal encodings corresponds to a different decimation order, and that, for any encoding, all X indices not associated with that encoding's decimation order would be set to zero (e.g., for the decimation order 0 encoding, all X indices not denoted as corresponding to decimation order 0 would be set to zero; for the decimation order 1 encoding, all X not denoted as corresponding to decimation order 1 would be set to zero; etc.). Further, note that the first d−1=3 bins (at X indices 0-3), the middle bin (at X index 1024), and the final d−1=3 bins (at X indices 2045-2047), all have a value of zero for all the encodings. A specific example of a portion of the spectra resulting from one such mapping is shown in FIG. 4B, where the legend indicates the decimation order for each spectrum.

For each of the d (or fewer) resulting decimated spectra, a corresponding spectrally decimated code can be generated by performing an inverse discrete Fourier transform (e.g., inverse fast Fourier transform (IFFT)). Thus, this process can result in the generation of up to d spectrally-orthogonal encodings of length N (one encoding generated from the IFFT of each of the d decimated spectra).

However, the spectrally-orthogonal encodings can additionally or alternatively be generated in any other suitable manner and/or have any other suitable properties.

Although described herein as performing an FFT and/or IFFT, a person of skill in the art will recognize that any other suitable technique for performing (and/or approximating the performance of) a discrete Fourier transform and/or inverse discrete Fourier transform may additionally or alternatively be employed in an analogous manner.

Figure 4C:
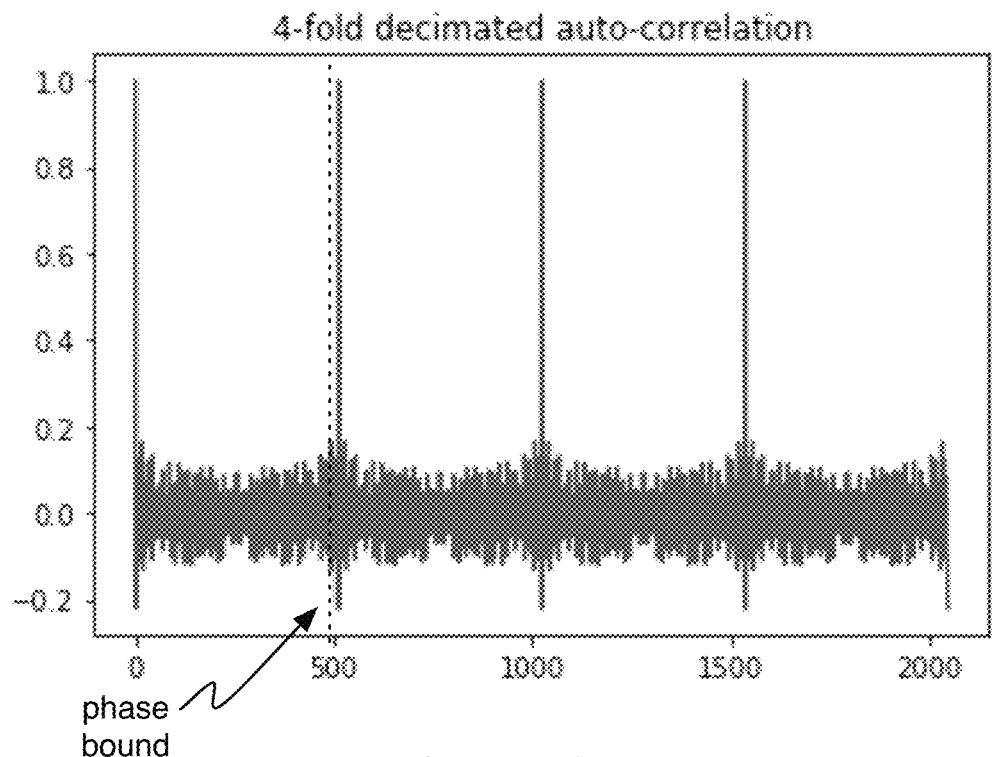
FIGS. 4C-4D are chart representations of autocorrelation properties of a first and second specific example, respectively, of a spectrally-decimated encoding.
Figure 4D:
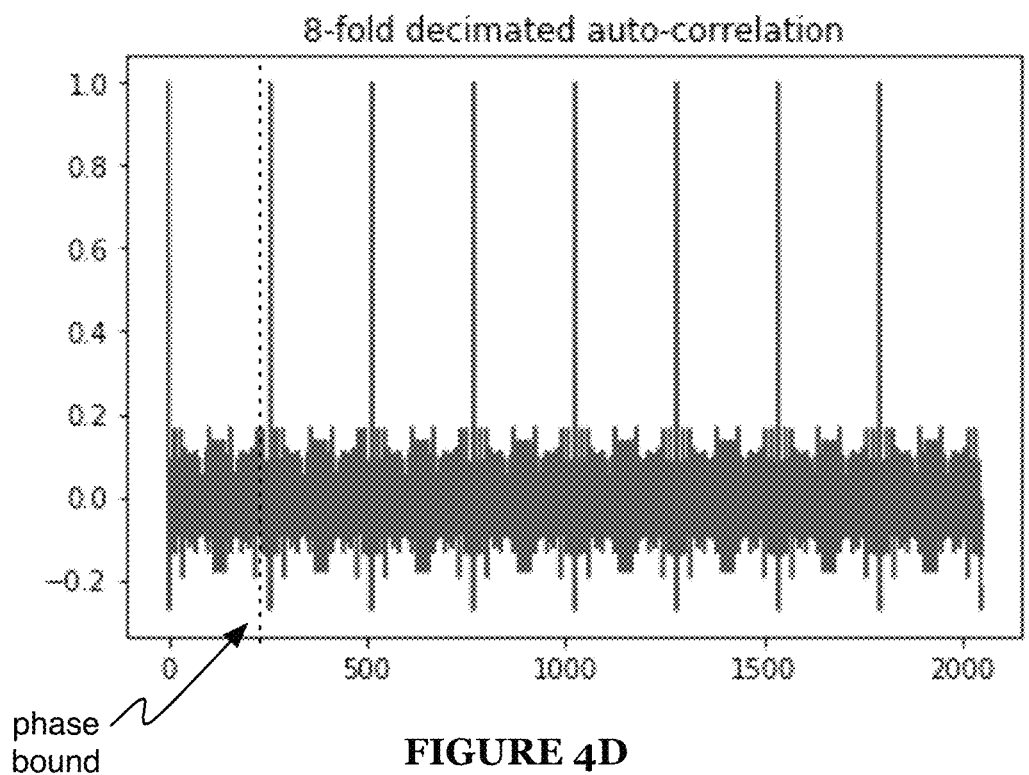

The spectrally-orthogonal encodings (e.g., generated as described above) do not share any non-zero frequency bins (i.e., if one encoding has a non-zero value in frequency bin X=i, then all other spectrally-orthogonal codes will have a value of zero in that frequency bin X=i). Accordingly, the cross-correlation between any two of these spectrally-orthogonal codes will be uniformly zero everywhere. Further, the auto-correlation of any one of these codes will exhibit a peak at zero phase offset, repeated periodically based on the degree d of spectral decimation (e.g., wherein n-fold spectral decimation results in n periods, such as 4-fold spectral decimation resulting in 4 periods, 8-fold spectral decimation resulting in 8 periods, etc.), such as shown by way of example in FIGS. 4C-4D. Accordingly, the auto-correlation will define a phase bound (e.g., bounded by the periodicity arising from spectral decimation, such as bounded by the closest non-zero phase offset peak), wherein this phase bound is preferably a range throughout which the auto-correlation is substantially non-zero except for at the zero phase offset peak.

In some examples, it may be beneficial to use one or more code families which include multiple spectrally decimated encodings (e.g., of the same length) that are not spectrally-orthogonal (e.g., that share the same non-zero frequency bins). For example, sets of spectrally-orthogonal code families (e.g., wherein each encoding of one code family is spectrally-orthogonal to the encodings of any other code family of the set) can be utilized. To generate such sets of code families, spectral decimation can be performed separately (using the same spectral decimation factor) for each of a group of input encodings (e.g., input code family), preferably wherein each input encoding has the same length. Within a code family, the different encodings preferably exhibit low cross-correlation (e.g., within a phase bound, such as the phase bound defined by the auto-correlation, typically an auto-correlation phase bound arising from spectral decimation). In examples, the input code family can be a group of phase-bounded low cross-correlation encodings (PB-LCCs), can be a group of offset-tolerant low cross-correlation codes (OT-LCCs) such as complementary encoding sets (e.g., periodic complementary sets, such as Golay sequences), and/or can include any other suitable sets of encodings (e.g., having desirable auto-correlation and/or cross-correlation properties), such as described in U.S. patent application Ser. No. 17/738,959, filed 6 May 2022 and titled "LIDAR SYSTEM AND METHOD OF OPERATION", and/or in U.S. patent application Ser. No. 17/964,786, filed 12 Oct. 2022 and titled "LIDAR SYSTEM AND METHOD OF OPERATION", each of which is herein incorporated in its entirety by this reference (e.g., as described therein regarding 'Encodings', such as regarding the auto-correlation and/or cross-correlation properties thereof).

In examples in which a code family (or input code family) defines a phase bound, this phase bound is preferably comparable to the auto-correlation phase bound imposed by spectral decimation. However, this phase bound can alternatively be larger than the auto-correlation phase bound (wherein the auto-correlation defines a maximum resolvable phase shift), or smaller than the auto-correlation phase bound (wherein the cross-correlation within a code family defines the maximum resolvable phase shift).

However, the system and/or method can additionally or alternatively use any other suitable encodings.

5. Method.

5.1 Determining a Signal.

Figure 3A:
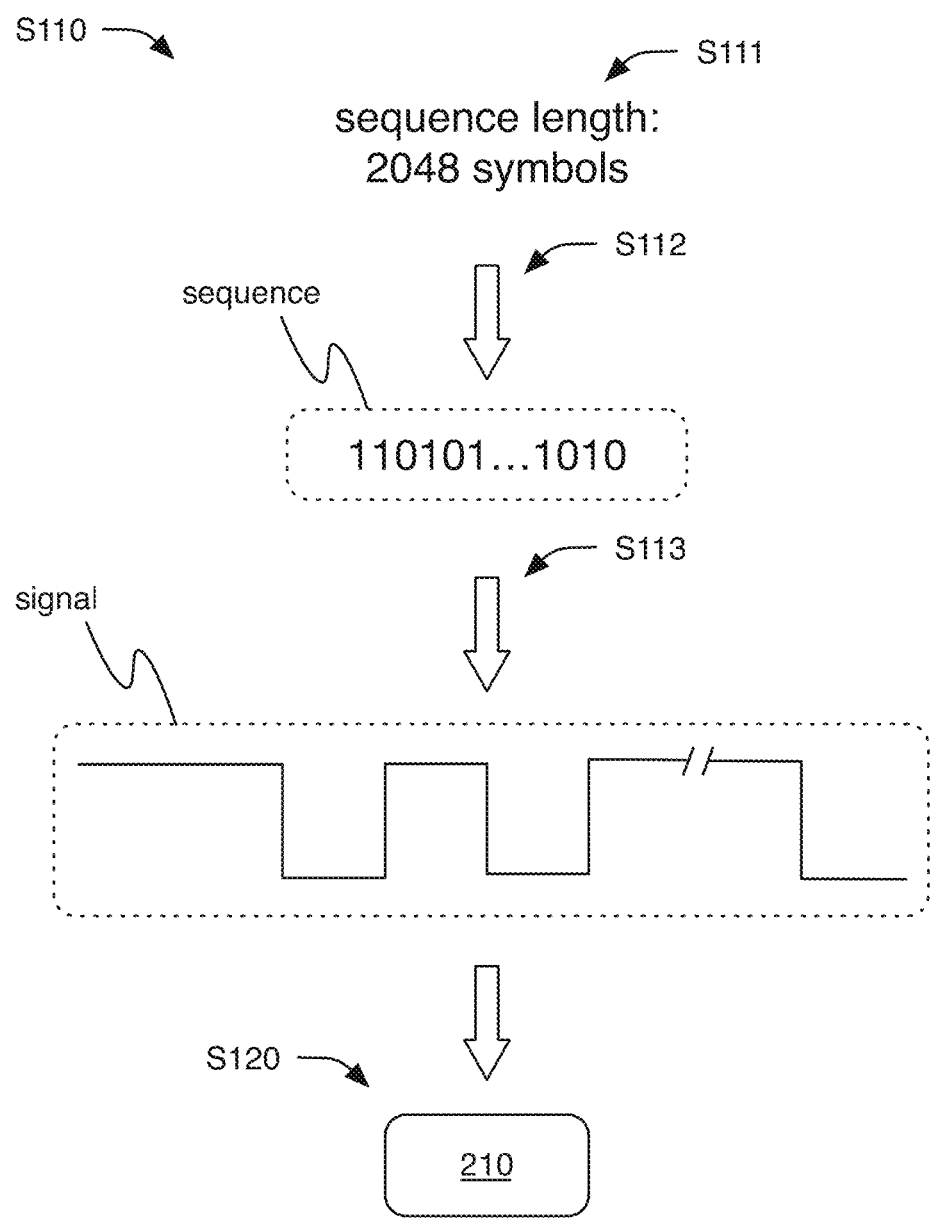
FIGS. 3A-3B are schematic representations of examples of determining signals.

Determining a signal S110 preferably functions to determine the signal that the lidar system outputs, which can function to control various aspects of object detection performance. Determining the signal S110 preferably includes determining a sequence S112 and/or encoding the sequence S113, and can optionally include determining a sequence length S111 (e.g., as shown in FIG. 3A). However, S110 can additionally or alternatively include any other suitable elements.

Determining the signal S110 is preferably performed such as described in in U.S. patent application Ser. No. 17/738,959, filed 6 May 2022 and titled "LIDAR SYSTEM AND METHOD OF OPERATION", and/or in U.S. patent application Ser. No. 17/964,786, filed 12 Oct. 2022 and titled "LIDAR SYSTEM AND METHOD OF OPERATION", each of which is herein incorporated in its entirety by this reference. However, S110 can additionally or alternatively be performed in any other suitable manner.

5.1.1 Determining a Sequence Length.

Figure 3B:
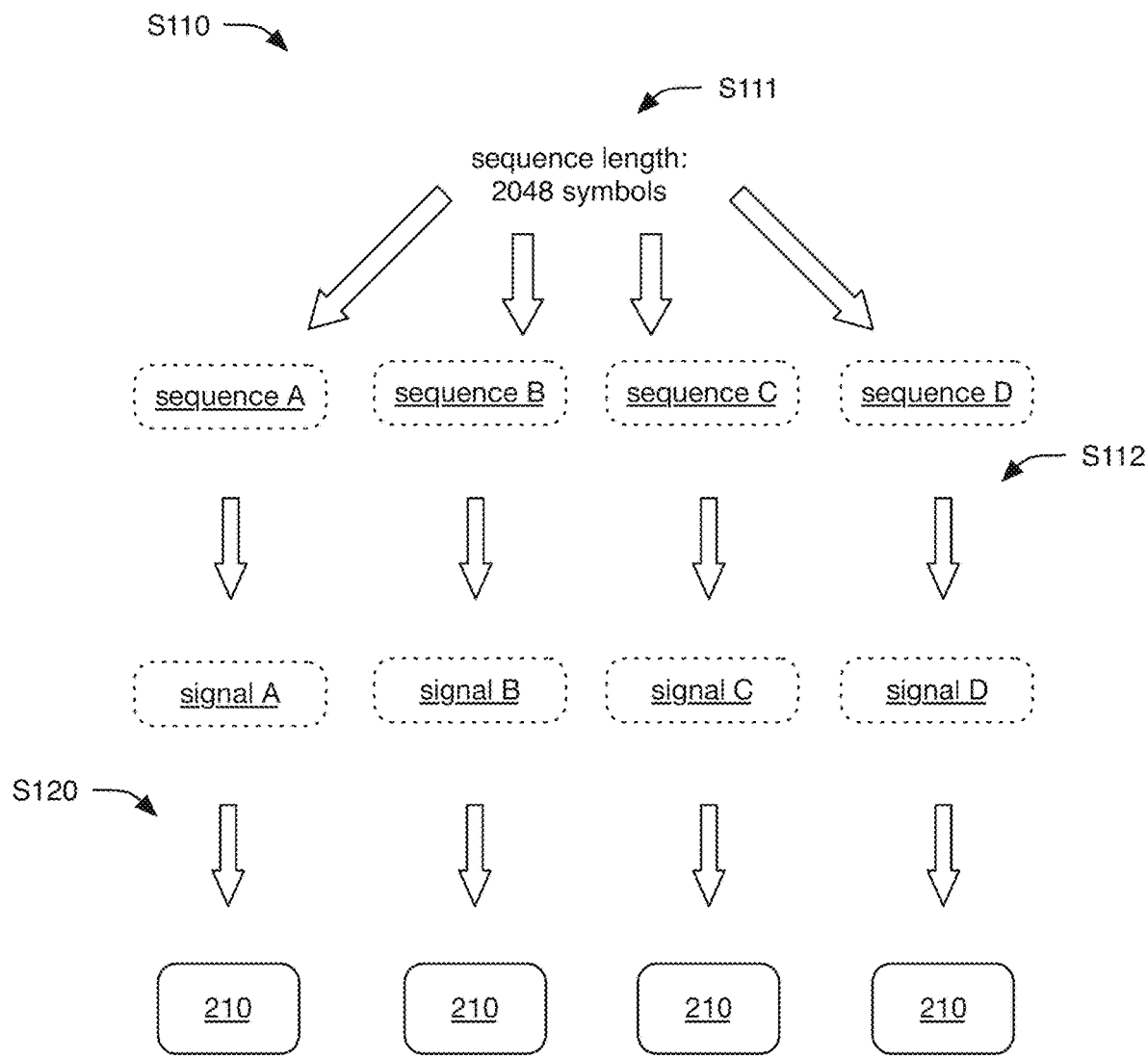

Determining a sequence length S111 can function to control tradeoffs between various system performance metrics (e.g., as described below in further detail). The sequence length is preferably a metric associated with sequence size, such as corresponding to a number of substantially equal-duration time intervals in which the sequence can take on different values (e.g., different output intensities). In examples, the sequence length can be a number of continuously (or pseudo-continuously) valued output intensities (e.g., represented as digital numerical representations such as integer or floating point representations, represented as analog intensities, etc.) in the sequence, a bit-length (e.g., wherein the sequence is a binary sequence), a number of symbols (e.g., non-binary digits) in the sequence, an effective sequence length equal to a signal duration multiplied by a system bandwidth or a value proportional thereto (e.g., wherein, for a continuously-varying signal, the effective sequence length is representative of the approximate number of samples that the system can resolve in the signal), and/or any other suitable metric associated with sequence size. The same sequence length N is preferably used for multiple sequences, such as concurrently-emitted sequences (e.g., wherein a plurality of sequences are output substantially concurrently, such as each output by a different optical emitter of the system; example shown in FIG. 3B) and/or serial sequences (e.g., a time series of multiple sequences, emitted by a single optical emitter of the system). Alternatively, different sequence lengths can be used for a single continuous signal and/or multiple, concurrently-emitted signals.

The sequence length is preferably determined as described (e.g., as described regarding 'determining a sequence length S111') in one or more of: U.S. patent application Ser. No. 17/738,959, filed 6 May 2022 and titled "LIDAR SYSTEM AND METHOD OF OPERATION", U.S. patent application Ser. No. 17/964,786, filed 12 Oct. 2022 and titled "LIDAR SYSTEM AND METHOD OF OPERATION", and/or U.S. patent application Ser. No. 16/663,142, filed 24 Oct. 2019 and titled "LIDAR SYSTEM AND METHOD OF OPERATION", each of which is herein incorporated in its entirety by this reference, but can additionally or alternatively be determined in any other suitable manner.

However, S110 can alternatively include using a predetermined sequence length (e.g., rather than determining a sequence length dynamically), and/or the sequence length can be determined in any other suitable manner.

5.1.2 Determining a Sequence.

Determining a sequence S112 preferably functions to determine one or more unique sequences (e.g., all having a particular sequence length, such as a sequence length determined in Sin). Each sequence can be a digital sequence (e.g., binary sequence, non-binary digital sequence, etc.), an analog (e.g., continuously-valued and/or pseudo-continuously-valued) sequence, such as a sequence of integers and/or of real numbers (e.g., in digital, analog, and/or any other suitable representation), and/or any other suitable sequence. In some embodiments, the sequences can be determined such as described in one or more of: U.S. patent application Ser. No. 17/738,959, filed 6 May 2022 and titled "LIDAR SYSTEM AND METHOD OF OPERATION", U.S. patent application Ser. No. 17/964,786, filed 12 Oct. 2022 and titled "LIDAR SYSTEM AND METHOD OF OPERATION", and/or U.S. patent application Ser. No. 16/663,142, filed 24 Oct. 2019 and titled "LIDAR SYSTEM AND METHOD OF OPERATION", each of which is herein incorporated in its entirety by this reference, but can additionally or alternatively be determined in any other suitable manner.

The sequences are preferably determined to achieve a high degree of orthogonality (e.g., orthogonality between different sequences, orthogonality between encoded signals corresponding to the different sequences, orthogonality to environmental noise, orthogonality between phase-delayed versions of the same sequence, etc.). Accordingly, the sequences are preferably determined to meet one or more of the following criteria (e.g., as described in more detail in one or more of: U.S. patent application Ser. No. 17/738,959, filed 6 May 2022 and titled "LIDAR SYSTEM AND METHOD OF OPERATION", U.S. patent application Ser. No. 17/964,786, filed 12 Oct. 2022 and titled "LIDAR SYSTEM AND METHOD OF OPERATION", and/or U.S. patent application Ser. No. 16/663,142, filed 24 Oct. 2019 and titled "LIDAR SYSTEM AND METHOD OF OPERATION", each of which is herein incorporated in its entirety by this reference): high auto-correlation at zero time delay (zero phase offset); low auto-correlation away from zero time delay (non-zero phase offset); and/or low cross-correlation with other signals present in the system's environment (e.g., other sequences of a set).

The low auto-correlation can be exhibited for some or all non-zero phase offsets (e.g., for a spectrally-decimated encoding, exhibited for non-zero phase offsets within a phase bound defined by the degree of spectral decimation; alternatively, exhibited for all non-zero phase offsets within the phase bound except for one or more small phase alignment ranges for which the encoding is known to exhibit higher auto-correlation). Additionally or alternatively, the low cross-correlation can be exhibited for some or all phase offsets (e.g., for a set of PB-LCCs, exhibited for phase offsets within a phase bound defined by the set of PB-LCCs; alternatively, exhibited for all phase offsets within the phase bound except for one or more small phase alignment ranges for which the PB-LCCs are known to exhibit higher cross-correlation).

S112 can optionally include determining a detection range limit (and a corresponding phase bound) and/or otherwise determining a phase bound. The detection range limit is preferably consistent with (e.g., no more limiting than) other system limitations (but alternatively can be more limiting). For example, the detection range limit can be consistent with hardware and/or regulatory considerations (e.g., light intensity, photodetector sensitivity, hardware noise floor, etc.) which limit detection range to a threshold distance $D_1$ (e.g., 500 m). In this example, the encoding sequence length can correspond to a greater distance $D_2$ (e.g., 5 km), preferably wherein $D_2=tc/2$, where t is the encoding sequence period and c is the speed of light. Thus, in this example, the phase bound can be set greater than or equal to $D_1/D_2$; for $D_1=500$ m and $D_2=5$ km, $D_1/D_2=10\%$ of the period, corresponding to a phase bound equal to or wider than $+/-36°$. The phase bound can be predetermined (e.g., based on system calibration and/or performance metrics, based on historical data, based on any other suitable information, etc.), dynamically determined (e.g., based on current and/or recent system performance and/or other data), and/or determined in any other suitable manner.

Preferably, S112 includes determining multiple sequences (e.g., each associated with a different emitter, such as different emitters of the system, of different systems, etc.), preferably each having the same sequence length (e.g., a single sequence length determined in Sin). In some embodiments, S112 includes determining a plurality of spectrally-orthogonal encodings (e.g., via spectral decimation), such as the spectrally-orthogonal encodings described above in more detail. Further, S112 can optionally include determining code families (e.g., spectrally-orthogonal code families), such as described above. Determining the one or more spectrally-orthogonal encodings preferably includes: selecting a degree of spectral decimation, determining one or more input sequences to be spectrally decimated, and performing spectral decimation to generate spectrally-orthogonal encodings.

The degree of spectral decimation is preferably selected based on the phase bound (e.g., phase bound determined such as described above), more preferably wherein the selected degree results in an auto-correlation phase bound equal to (or wider than) the phase bound determined as described above. The degree of spectral decimation is preferably a power of two (e.g., 2-fold decimation, 4-fold decimation, 8-fold decimation, 16-fold decimation, etc.), but can alternatively be any other suitable degree (e.g., between 2 and 16, between 16 and 32, etc.).

Determining one or more input sequences preferably functions to determine input sequences having suitable properties for the application (e.g., having auto-correlation and/or cross-correlation properties such as described above). In a first example, S112 includes determining a single input sequence. This input sequence preferably exhibits auto-correlation properties such as described above (e.g., having zero, substantially zero, or low auto-correlation for all non-zero phase offsets).

In a second example, S112 includes determining multiple input sequences (e.g., collectively defining an input code family). In this example, the input sequences preferably exhibit both the desired auto-correlation and cross-correlation properties such as described above (e.g., as described in U.S. patent application Ser. No. 17/738,959, filed 6 May 2022 and titled "LIDAR SYSTEM AND METHOD OF OPERATION", and/or in U.S. patent application Ser. No. 17/964,786, filed 12 Oct. 2022 and titled "LIDAR SYSTEM AND METHOD OF OPERATION", each of which is herein incorporated in its entirety by this reference). In some examples, the input sequences can include PB-LCCs, complementary sequence sets, and/or any other suitable sets of encodings having the desired auto-correlation and/or cross-correlation properties. In examples in which the input sequences exhibit phase-bounded correlation properties (e.g., wherein the cross correlation is low within a phase bound, but not necessarily low outside that phase bound), the code family preferably exhibits a phase bound equal to (or wider than) the phase bound determined as described above, and/or the phase bound imposed by the degree of spectral decimation.

However, S112 can additionally or alternatively include determining any other suitable input sequences in any suitable manner.

For each input sequence, S112 preferably includes performing spectral decimation to generate a corresponding set of spectrally-orthogonal encodings. For example, if an input code family includes m input sequences, S112 can include performing d-fold spectral decimation on each of the m input sequences, thereby generating d spectrally-orthogonal code families of m encodings each (md total encodings). In some such examples (e.g., in which the input encodings are PB-LCCs and/or other encodings exhibiting a phase bound), it can be preferable for m and d to be equal, substantially equal, or similar in magnitude, as similar phase bounds and/or other performance limitations may be encountered both based on the number of PB-LCCs in a code family and based on the degree of spectral decimation. In one such example, m=d=4. However, m and d can alternatively have any other suitable values (e.g., absolute values, values relative to each other, etc.).

The determined encodings are preferably stored (e.g., for use in analyzing return signals, such as described below regarding S140, such as in filtering the samples, such as described below regarding S142). More preferably, the encodings are stored in the frequency domain. Optionally, storing the encodings can include storing only the non-zero values of the frequency bins (e.g., storing only the spectrum of the input encoding rather than the spectrally decimated spectra). However, the encodings can additionally or alternatively be stored in any other suitable manner.

Determining the sequences (e.g., determining input sequences and/or determining spectrally-orthogonal sequences) can include selecting from a plurality of predetermined encodings (e.g., selecting based on one or more parameters, such as sequence length and/or phase bound), dynamically generating (e.g., computing) the encodings (e.g., based on, such as in response to determining and/or receiving, one or more parameters, such as sequence length and/or phase bound), and/or determining the encodings in any other suitable manner. For example, the system can maintain a database of code families (e.g., input code families, spectrally-decimated code families, etc.), such as code families for each of a plurality of encoding lengths and/or phase bounds. The database can optionally include a matched filter set (e.g., Fourier transforms and/or discrete Fourier transforms of each of the sequences and/or corresponding encoded signals) for the codes of the database (or a subset thereof). In some examples, the database includes only a frequency-domain representation of the codes (e.g., includes only the input spectra used to generate, via spectral decimation, each spectrally-orthogonal set of codes).

However, the sequences can additionally or alternatively be determined in any other suitable manner.

In examples, the sequences can include one or more of: continuously (or pseudo-continuously) valued output intensities (e.g., represented as digital numerical representations such as integer or floating point representations, represented as analog intensities, etc.), binary outputs (e.g., high and low, such as on and off, values), symbols (e.g., corresponding to non-binary digits), continuously-varying outputs, and/or any other suitable sequence elements.

5.1.3 Encoding the Sequence.

Encoding the sequence S113 preferably functions to generate an encoded signal based on the sequence (e.g., for each sequence determined in S112, generating a corresponding encoded signal). The generated signal is preferably periodic, repeating the encoded sequence, more preferably wherein there is no (or substantially no) temporal gap between sequence repeats (e.g., wherein the encoded sequence restarts as soon as the previous iteration ends) but alternatively including substantial temporal gaps between some or all sequence repeats. However, the generated signal can alternatively be aperiodic and/or have any other suitable characteristics. Generating the encoded signal preferably includes modulating a carrier signal (more preferably, a continuous-wave or substantially continuous-wave carrier signal), such as an optical carrier (e.g., laser output) of substantially constant amplitude or substantially periodically-varying amplitude (e.g., sinusoid, square wave, etc.). S113 is preferably performed such as described in one or more of: U.S. patent application Ser. No. 17/738,959, filed 6 May 2022 and titled "LIDAR SYSTEM AND METHOD OF OPERATION", U.S. patent application Ser. No. 17/964,786, filed 12 Oct. 2022 and titled "LIDAR SYSTEM AND METHOD OF OPERATION", and/or U.S. patent application Ser. No. 16/663,142, filed 24 Oct. 2019 and titled "LIDAR SYSTEM AND METHOD OF OPERATION", each of which is herein incorporated in its entirety by this reference, but can additionally or alternatively be performed in any other suitable manner.

However, the sequence can additionally or alternatively be encoded in any other suitable manner.

5.2 Outputting the Signal.

Outputting the signal S120 preferably functions to emit an output (e.g., a beam, preferably a beam of light) that includes the signal to be output (e.g., the signal determined in S110). S120 can include controlling a transducer, preferably an optical emitter such as described above (e.g., a laser), to output the signal. For example, a modulator (e.g., as described above, such as regarding the system 200) can be employed to include the signal in the output, such as by modulating the amplitude, optical frequency, and/or any other suitable characteristic(s) of an optical carrier (e.g., continuous-wave laser beam) based on the signal. S120 preferably includes continuously outputting the signal (e.g., for a periodic signal), but can alternatively include outputting the signal a single time and/or any other suitable number of times with any suitable timing. In embodiments including multiple transducers (e.g., multiple optical emitters, such as multiple lasers), S120 preferably includes emitting multiple outputs, more preferably concurrently or substantially concurrently (e.g., emitting all the outputs continuously or substantially continuously, emitting pulsed and/or sporadic outputs at substantially the same time as each other, etc.). However, the multiple outputs can additionally or alternatively be emitted with any other suitable timing.

During S120, the beam director is preferably controlled to direct the output signal toward one or more external locations 30 (e.g., as described above, such as regarding the system 200). Upon reaching the external location(s), the beam can be reflected (e.g., back toward the system). In one example, the beam director can be controlled to direct the beam substantially in a first direction over a first dwell time interval (e.g., substantially equal to one period of the signal), then in a second direction over a second dwell time interval, preferably substantially equal in duration to the first dwell time interval, and so on, eventually substantially returning to the first direction and repeating continuously (e.g., until the output parameters, such as sequence length, resolution, symbol rate, etc., are altered).

S120 is preferably performed such as described in one or more of: U.S. patent application Ser. No. 17/738,959, filed 6 May 2022 and titled "LIDAR SYSTEM AND METHOD OF OPERATION", U.S. patent application Ser. No. 17/964,786, filed 12 Oct. 2022 and titled "LIDAR SYSTEM AND METHOD OF OPERATION", and/or U.S. patent application Ser. No. 16/663,142, filed 24 Oct. 2019 and titled "LIDAR SYSTEM AND METHOD OF OPERATION", each of which is herein incorporated in its entirety by this reference, but can additionally or alternatively be performed in any other suitable manner.

In embodiments in which multiple encodings (and/or decomposed portions thereof) are intended for use in combination, S120 preferably includes outputting signals corresponding to each such encoding (and/or decomposed portion thereof). Each such encoding (and/or decomposed portion thereof) is preferably output at a separate time, but preferably concurrent (or substantially concurrent) with output (e.g., from one or more other optical emitters and/or transducers) of the corresponding encodings (and/or decomposed portions thereof) of one or more other encoding sets (e.g., other encodings of the same code family, spectrally-orthogonal encodings such as encodings of other code families, etc.), such as described in U.S. patent application Ser. No. 17/964,786, filed 12 Oct. 2022 and titled "LIDAR SYSTEM AND METHOD OF OPERATION", which is herein incorporated in its entirety by this reference. However, S120 can additionally or alternatively include outputting multiple encodings and/or decomposed portions thereof with any other suitable timing and/or in any other suitable manner.

5.3 Receiving a Return Signal.

Receiving a return signal S130 preferably functions to detect one or more reflections of the output signal (e.g., from one or more objects within an environment surrounding the system, such as objects at the external location(s)). The signal can be received at a transducer (e.g., of the system, such as close to and/or otherwise collocated with the optical emitter or other output transducer of the system), preferably an optical detector (e.g., photodiode, such as an avalanche photodiode (APD), etc.), such as described above regarding the system 200. In some embodiments (e.g., wherein multiple signals are output substantially concurrently), multiple signals (e.g., reflections of different output signals, different reflections of a single output signal, etc.) can be received at the transducer during S130 (e.g., received substantially concurrently and/or otherwise temporally overlapping). The return signal is preferably a reflection (e.g., direct reflection, specular reflection, etc.) of the output signal. However, S130 can additionally or alternatively include receiving any return signal associated with (e.g., induced by) the output signal, and/or receiving any other suitable signals.

The received signal(s) are preferably sampled (e.g., by a circuit, such as an analog-to-digital converter circuit, that samples an electrical output of the transducer, such as the current and/or voltage generated by the transducer in response to reception of the received signals) at a sufficient rate to resolve the signal(s), such as sampling at a rate at least twice the bandwidth of the anticipated signal(s). In one example, the received signals are sampled at a rate of at least 2.5 times the symbol rate of the output signals (e.g., for a 100 MHz symbol rate, corresponding to a 125 MHz output signal bandwidth, sampling at a rate of at least 250 MHz).

S130 is preferably performed such as described in one or more of: U.S. patent application Ser. No. 17/738,959, filed 6 May 2022 and titled "LIDAR SYSTEM AND METHOD OF OPERATION", U.S. patent application Ser. No. 17/964,786, filed 12 Oct. 2022 and titled "LIDAR SYSTEM AND METHOD OF OPERATION", and/or U.S. patent application Ser. No. 16/663,142, filed 24 Oct. 2019 and titled "LIDAR SYSTEM AND METHOD OF OPERATION", each of which is herein incorporated in its entirety by this reference, but can additionally or alternatively be performed in any other suitable manner.

5.4 Analyzing the Return Signal.

Figure 5A:
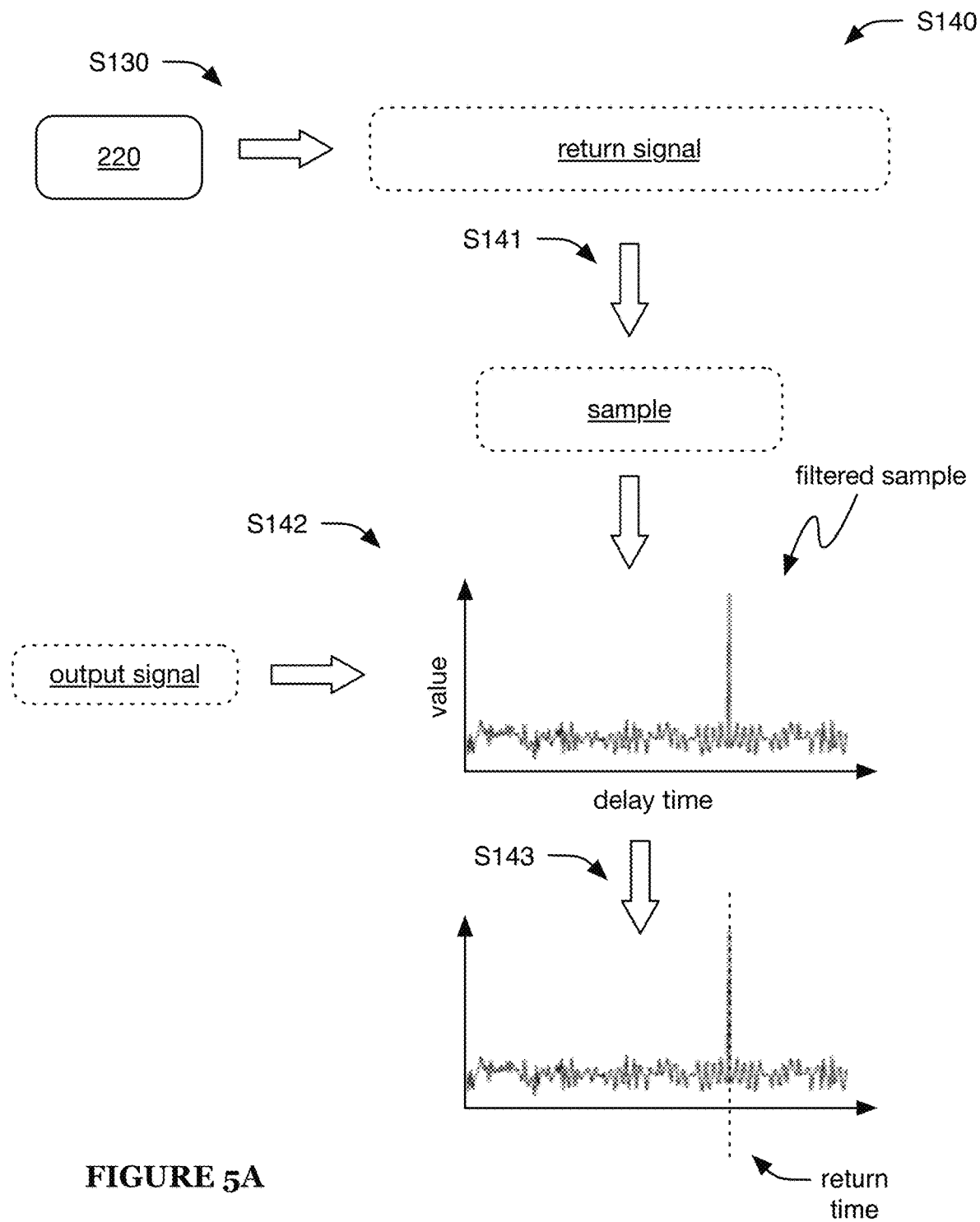
FIGS. 5A-5B are schematic representations of examples of analyzing return signals.

Analyzing the return signal S140 preferably functions to determine the position of one or more external locations (e.g., off of which the signal was reflected) relative to the system. Analyzing the return signal S140 preferably includes selecting a sample from the return signal S141, filtering the sample S142, and/or determining information based on the signal S143 (e.g., as shown in FIG. 5A). However, analyzing the return signal S140 can additionally or alternatively include determining additional information S144 and/or any other suitable elements.

Selecting a sample from the return signal S141 preferably functions to select a portion of the return signal for analysis. The selected sample is preferably a contiguous window of the received signal. The sample window is preferably sufficiently long in duration to capture an entire period of the output signal. In one example, the sample duration is preferably no less than the sum of the signal period (e.g., equal to the sequence length divided by the symbol rate) and the maximum propagation delay (e.g., equal to twice the range divided by the speed of signal propagation, such as the speed of light in the environment surrounding the system, which corresponds to the round-trip propagation time for an output signal that reflects off an external location at a distance equal to the range). However, S141 can additionally or alternatively include selecting a window of any other suitable duration, and/or selecting any other suitable sample.

In some examples, S141 includes selecting multiple samples from the return signal. For example, in embodiments in which correlations from multiple encodings (and/or decomposed portions thereof) are to be combined (e.g.; embodiments using complementary encoding sets, such as Golay sequence pairs; embodiments using unipolar decompositions of bipolar encodings; etc.), a different sample is preferably selected for each such encoding (and/or decomposed portion thereof), wherein each sample corresponds to a different one of the encodings (and/or a different one of the decomposed portions thereof).

Filtering the sample S142 preferably functions to isolate portions of the sample associated with (e.g., substantially matching) the corresponding output signal. S142 preferably includes performing a digital filtering process (e.g., performed computationally), such as implemented by a processing module (e.g., as described above). However, S142 can additionally or alternatively include otherwise performing the filtering process (e.g., analog and/or digital filtering process, such as one implemented by a filter circuit). The filter applied to the sample is preferably a matched filter (or substantially matched filter) for the corresponding output signal, but can additionally or alternatively be any other suitable filter. In examples in which S141 includes selecting multiple samples, S142 preferably includes filtering each of these samples (but can alternatively include filtering a subset thereof, such as only filtering one sample).

In one embodiment, S142 includes determining a convolution S1421 (e.g., circular convolution) of the output signal with the sample, preferably wherein one of the two are time-reversed (e.g., convolution of a time-reversed version of the periodic output signal with the sample, or convolution of the periodic output signal with a time-reversed version of the sample), such as a circular convolution of a time-reversed version of the periodic output signal with the sample. Although described herein as determining a convolution of the sample with the output signal, a person of skill in the art will recognize that S142 can analogously include determining a correlation of the sample and the output signal. In examples in which S142 includes filtering multiple samples, each sample is preferably convolved with a corresponding portion of the output signal (e.g., output signal portion that encodes the encoding or decomposed portion thereof that corresponds with the portion in question).

In some examples, the convolution is determined (partially or entirely) in the frequency domain. For example, determining the convolution can include: determining a Fourier transform (e.g., discrete Fourier transform, such as the FFT) of the sample, determining a Fourier transform (e.g., discrete Fourier transform) of the output signal (and/or retrieving a previously-determined Fourier transform of the output signal, such as one determined for a prior iteration of S142), multiplying the transformed output signal with the transformed sample (e.g., determining the Hadamard product of the transformed output signal and the transformed sample), and determining an inverse Fourier transform (e.g., inverse discrete Fourier transform) of the product (wherein the result of this inverse Fourier transform is the convolution of the two).

In some such examples, some or all frequency-domain operations (e.g., Hadamard product operations, IFFT operations, etc.) can be performed using only the N/d frequency bins associated with non-zero code values (e.g., using the input code spectra, rather than the spectrally-decimated spectra, as filters, and using only the corresponding frequency bins of the sample spectrum, for calculating the Hadamard product; performing an IFFT on the resulting Hadamard product to generate the desired convolution or an approximation thereof; etc.). For codes of non-zero spectral decimation order (i.e., $s>0$), an IFFT performed using only the N/d frequency bins associated with non-zero code values may produce an inexact result (e.g., introducing an erroneous cosine envelope dependent on the spectral decimation order, altering a cosine envelope by introducing an erroneous term within the cosine that is dependent on the spectral decimation order, etc.); however, it may be possible to correct for these inexact results, such as by dividing an unwanted factor out of the result or by performing the IFFT in a manner that accounts for the frequency bin offset. However, any or all frequency-domain operations can additionally or alternatively be performed in any other suitable manner.

S142 preferably generates a filtered sample that is a function of delay time. The filtered sample is typically a discrete function (e.g., the sample and/or output signal includes data only at discrete points in time, the calculation is performed at discrete points in delay time, etc.) but can alternatively be a continuous function and/or any other suitable function.

S142 can optionally include zero-padding the sample (e.g., wherein one or more zero-valued points are inserted into the sample, such as between each observed point of the sample determined in S130). The sample can be zero-padded before performing the filtering, and/or the filtered sample can be zero-padded after filtering.

In some embodiments, S142 can additionally or alternatively include any other suitable elements such as described in U.S. patent application Ser. No. 17/738,959, filed 6 May 2022 and titled "LIDAR SYSTEM AND METHOD OF OPERATION", and/or in U.S. patent application Ser. No. 17/964,786, filed 12 Oct. 2022 and titled "LIDAR SYSTEM AND METHOD OF OPERATION", each of which is herein incorporated in its entirety by this reference (e.g., as described therein regarding 'filtering the sample S142').

However, S142 can additionally or alternatively include filtering the sample in any other suitable manner.

Determining information based on the signal S143 preferably functions to detect the presence and/or absence of (and/or to determine information, such as distance, optical properties, etc., regarding) objects in the environment (e.g., the external locations off of which the output signal is reflected). S143 is preferably performed based on the filtered sample generated in S142, but can additionally or alternatively be performed using the as-received sample selected in S141 and/or any other suitable information associated with the signal (e.g., received signal). S143 is preferably performed as described in U.S. patent application Ser. No. 17/738,959, filed 6 May 2022 and titled "LIDAR SYSTEM AND METHOD OF OPERATION", and/or in U.S. patent application Ser. No. 17/964,786, filed 12 Oct. 2022 and titled "LIDAR SYSTEM AND METHOD OF OPERATION", each of which is herein incorporated in its entirety by this reference, but can additionally or alternatively be performed in any other suitable manner.

S140 can optionally include determining additional information S144. In some embodiments, S144 can function to detect multiple extrema (e.g., corresponding to multiple reflections) in a single sample. For example, S144 can enable recognition of "multi-return" events (e.g., wherein a beam is incident on the edge of an object, and thus a first portion of the beam is reflected by the object which a second portion of the beam continues on, possibly to be reflected by a second object; wherein a beam is incident on a semi-transparent object, and thus the beam is partially reflected by the object and partially transmitted through the object, possibly to be reflected by a second object; etc.). Preferably, S144 includes detecting all discernable extrema of interest (e.g., maxima above the noise floor). S144 is preferably performed as described in U.S. patent application Ser. No. 17/738,959, filed 6 May 2022 and titled "LIDAR SYSTEM AND METHOD OF OPERATION", and/or in U.S. patent application Ser. No. 17/964,786, filed 12 Oct. 2022 and titled "LIDAR SYSTEM AND METHOD OF OPERATION", each of which is herein incorporated in its entirety by this reference, but can additionally or alternatively be performed in any other suitable manner.

Figure 5B:
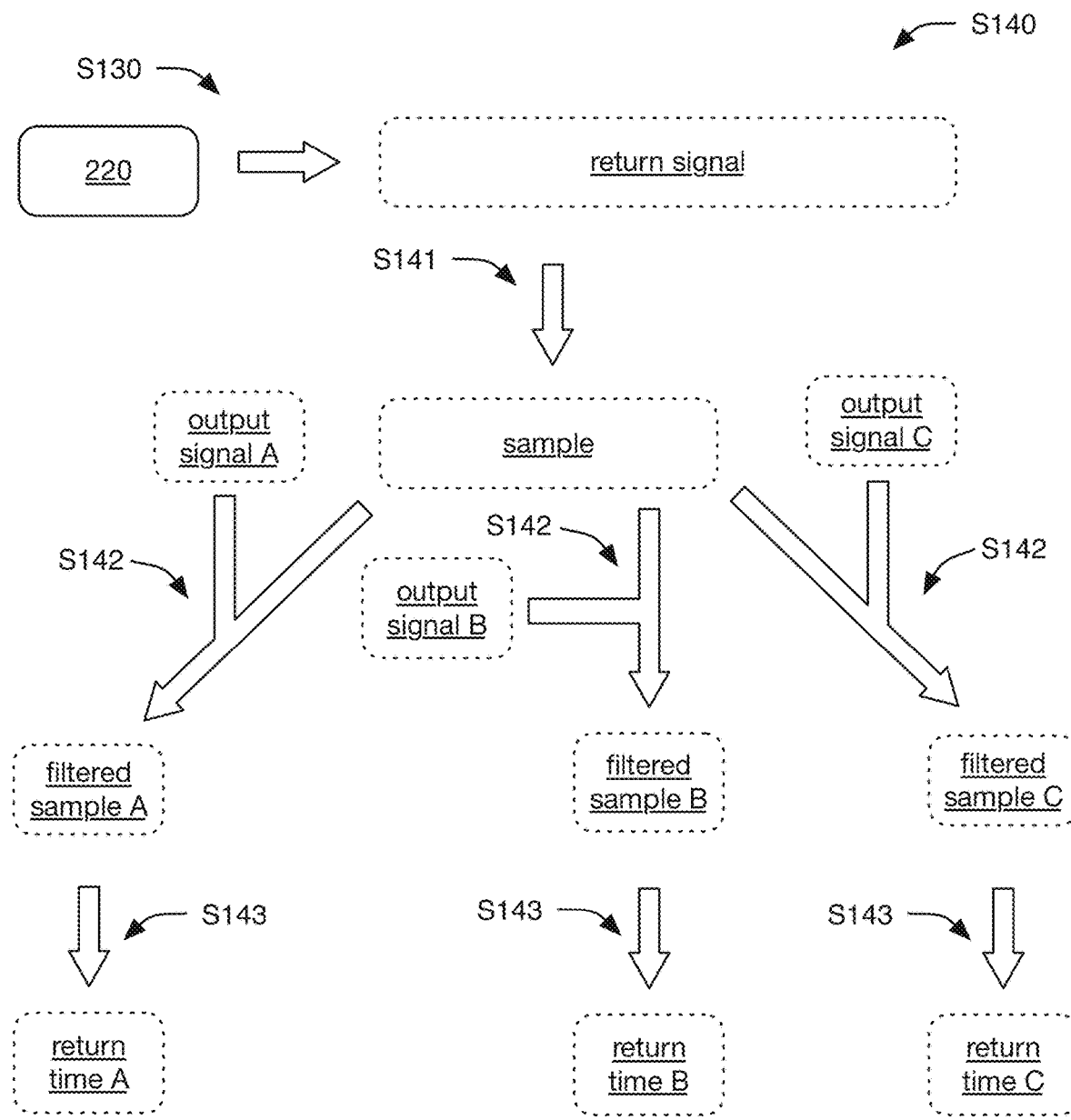

In embodiments in which multiple signals are output concurrently and/or close in time (e.g., wherein several such signals may be received concurrently in S130), S140 is preferably performed for each such output signal (e.g., as shown in FIG. 5B). For example (e.g., wherein the sequence length and symbol rate for all the signals is equal), a single sample can be selected (as described above regarding S141) for all such output signals, and then some or all remaining elements of S140 (e.g., S142, S143, S144, etc.) can be performed (e.g., independently) for each such output signal, using the same sample. Because the different output signals preferably have high mutual orthogonality (e.g., as described above, such as: codes of a code family having high mutual orthogonality, either within a phase bound, throughout or substantially throughout all possible phase shifts, and/or in any other suitable phase shift regions; codes with different spectral decimation order, such as codes of different code families, being spectrally-orthogonal; etc.), a high degree of discrimination between the different output signals can be enabled by this method (e.g., wherein most noise associated with the other output signals is filtered out in S142). Embodiments of the method can additionally or alternatively achieve high mutual interference immunity (e.g., immunity to interference from noise originating from other sources, such as from other lidar systems and/or any other suitable emitters), especially for longer sequence lengths, as these noise sources may also have reasonably high orthogonality to the output signals used by the lidar system.

In some examples, S140 is performed such as described in in U.S. patent application Ser. No. 16/663,142, filed 24 Oct. 2019 and titled "LIDAR SYSTEM AND METHOD OF OPERATION", which is herein incorporated in its entirety by this reference, and/or one or more elements of S140 are performed such as described in U.S. patent application Ser. No. 16/663,142 regarding 'analyzing the return signal S140' (e.g., wherein one or more other elements of S140 are performed such as described above). However, S140 can additionally or alternatively be performed in any other suitable manner.

5.5 Repeating Elements of the Method.

The method 100 can optionally include repeating one or more of the elements described above. One embodiment includes performing S120 and/or S130 (e.g., continuously performing S120 and S130, preferably substantially concurrently), preferably while repeating S140 and/or changing the beam direction (e.g., sweeping the beam around the environment, such as described above). In this embodiment, all or substantially all of the signal received in S130 is preferably analyzed over the iterations of S140 (e.g., wherein for each iteration of S140, a different sample of the received signal, preferably the sample immediately following the previous sample, is used).

In a variation of this embodiment, some or all elements of S110 can optionally be repeated (e.g., periodically, such as after a threshold period of time, a threshold number of iterations of S140, a threshold number of sweeps of the beam, etc.; sporadically; in response to triggers; etc.), wherein S120, S130, and/or S140 can continue to be performed (e.g., based on the new sequence(s) determined in the most recent iteration of S110). In a first example of this variation, a new sequence length is selected (e.g., to alter some or all of the performance metrics, such as accuracy, range, resolution, latency, etc.), such as described above regarding S111, after which S112 is performed based on the new sequence length. In a second example, a new sequence (or sequences) is selected (e.g., as described above regarding S112) using the same sequence length as before (e.g., with a different phase bound). This second example can optionally be performed if the sequence orthogonality (e.g., to external noise sources, such as noise from other lidar systems) is suspected to be poor (e.g., if signal discrimination performance is poor). For example, if another nearby lidar system (e.g., mounted to a vehicle operating near the present lidar system) is using one or more output signals similar to (e.g., not sufficiently orthogonal to) one or more of the current output signals of the present lidar system, the method may not achieve sufficient immunity to this interference source. Thus, by changing the sequence(s), greater mutual interference immunity may be achieved. In a variation, the second example can additionally or alternatively be performed if the phase bound is smaller than desired (e.g., causing an undesired range limitation) and/or if the phase bound is larger than desired (e.g., resulting in a low rejection ratio, such as wherein a high-intensity return signal cannot be sufficiently filtered out of a lower-intensity return signal, resulting in potential false detection events). This second example can additionally or alternatively be performed periodically, sporadically, and/or with any other suitable timing (e.g., changing operation to diagnose whether the system is operating as desired), and/or performed for any other suitable reason.

However, the method 100 can additionally or alternatively include repeating any other suitable elements with any suitable timing.

Although omitted for conciseness, the preferred embodiments include every combination and permutation of the various system components and the various method processes. Furthermore, various processes of the preferred method can be embodied and/or implemented at least in part as a machine configured to receive a computer-readable medium storing computer-readable instructions. The instructions are preferably executed by computer-executable components preferably integrated with the system. The computer-readable medium can be stored on any suitable computer readable media such as RAMs, ROMs, flash memory, EEPROMs, optical devices (CD or DVD), hard drives, floppy drives, or any suitable device. The computer-executable component is preferably a general or application specific processing subsystem, but any suitable dedicated hardware device or hardware/firmware combination device can additionally or alternatively execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method for environment mapping, comprising:
   selecting an input encoding;
   generating, via spectral decimation of the input encoding, a set of spectrally-orthogonal encodings comprising a first encoding and a second encoding, wherein generating the set comprises, based on a frequency-domain representation of the input encoding, the frequency-domain representation of the input encoding defining a first number n of frequency bins of non-zero amplitude:
   generating a frequency-domain representation of the first encoding, the frequency-domain representation of the first encoding defining a second number of frequency bins, wherein the second number is equal to or greater than $2n-1$; and
   generating a frequency-domain representation of the second encoding, the frequency-domain representation of the second encoding defining a third number of frequency bins, wherein the third number is equal to or greater than 2n−1;

generating a first optical output representative of a first output signal, comprising modulating a first substantially continuous-wave carrier signal based on the first encoding;

generating a second optical output representative of a second output signal, comprising modulating a second substantially continuous-wave carrier signal based on the second encoding;

throughout a time period, concurrently transmitting the first and second optical outputs into an environment;

at an optical sensor, receiving a return signal, the return signal comprising:
 a first reflection, from a first object within the environment, of the first optical output; and
 a second reflection, from a second object within the environment, of the second optical output;

determining a sample by selecting a contiguous time window of the return signal;

generating a first filtered sample, comprising filtering the sample based on the first encoding;

determining a first phase delay associated with the first filtered sample;

based on the first phase delay, determining a relative location of the first object;

generating a second filtered sample, comprising filtering the sample based on the second encoding;

determining a second delay time associated with the second filtered sample; and based on the second delay time, determining a relative location of the second object.

2. The method of claim 1, wherein:
the number of frequency bins of non-zero amplitude in the frequency-domain representation of the first encoding is n; and
the number of frequency bins of non-zero amplitude of non-zero amplitude in the frequency-domain representation of the second encoding is n.

3. The method of claim 2, wherein:
generating the frequency-domain representation of the first encoding is performed based on a first bijective mapping from the frequency bins of non-zero amplitude of the frequency-domain representation of the input encoding to the frequency bins of non-zero amplitude of the frequency-domain representation of the first encoding, wherein the amplitudes of each pair of frequency bins of non-zero amplitude defined by the first bijective mapping are equal; and
generating the frequency-domain representation of the second encoding is performed based on a second bijective mapping from the frequency bins of non-zero amplitude of the frequency-domain representation of the input encoding to the frequency bins of non-zero amplitude of the frequency-domain representation of the second encoding, wherein the amplitudes of each pair of frequency bins of non-zero amplitude defined by the second bijective mapping are equal, wherein the second bijective mapping differs from the first bijective mapping.

4. The method of claim 1, wherein the second number is equal to the third number.

5. The method of claim 4, wherein:
generating the set of spectrally-orthogonal encodings is performed via d-fold spectral decimation of the input encoding; and
the second number is equal to or greater than nd−d+1.

6. The method of claim 5, wherein the set of spectrally-orthogonal encodings has a cardinality equal to d.

7. The method of claim 1, further comprising:
selecting a second input encoding;
generating, via spectral decimation of the second input encoding, a second set of spectrally-orthogonal encodings comprising a third encoding and a fourth encoding;
generating a third optical output representative of a third output signal, comprising modulating a third substantially continuous-wave carrier signal based on the third encoding;
generating a fourth optical output representative of a fourth output signal, comprising modulating a fourth substantially continuous-wave carrier signal based on the fourth encoding;
throughout the time period, concurrent with transmitting the first and second optical outputs into the environment, concurrently transmitting the third and fourth optical outputs into the environment; wherein the return signal further comprises:
 a third reflection, from a third object within the environment, of the third optical output; and
 a fourth reflection, from a fourth object within the environment, of the fourth optical output;
generating a third filtered sample, comprising filtering the sample based on the third encoding;
determining a third phase delay associated with the third filtered sample;
based on the third phase delay, determining a relative location of the third object;
generating a fourth filtered sample, comprising filtering the sample based on the fourth encoding;
determining a fourth delay time associated with the fourth filtered sample; and
based on the fourth delay time, determining a relative location of the fourth object.

8. The method of claim 7, wherein the input encoding and the second input encoding are selected from a group of offset-tolerant low cross-correlation codes (OT-LCCs).

9. The method of claim 8, wherein the group of OT-LCCs is a group of periodic complementary sets.

10. The method of claim 9, wherein the group of periodic complementary sets is a group of Golay sequences.

11. The method of claim 8, wherein the wherein the group of OT-LCCs is a group of phase-bounded low cross-correlation encodings (PB-LCCs), wherein the group of PB-LCCs defines a cross-correlation phase bound.

12. The method of claim 11, wherein:
generating the set of spectrally-orthogonal encodings is performed via d-fold spectral decimation of the input encoding, such that the set of spectrally-orthogonal encodings defines an auto-correlation phase bound;
generating the second set of spectrally-orthogonal encodings is performed via d-fold spectral decimation of the input encoding, such that the second set of spectrally-orthogonal encodings defines a second auto-correlation phase bound substantially equivalent to the auto-correlation phase bound; and
the auto-correlation phase bound is substantially equivalent to the cross-correlation phase bound.

13. The method of claim 7, wherein:
the frequency-domain representation of the first encoding comprises a first subset of frequency bins;
generating the frequency-domain representation of the first encoding is performed based on a first bijective mapping from the frequency bins of the frequency-domain representation of the input encoding to the first subset;

the frequency-domain representation of the second encoding comprises a second subset of frequency bins;

generating the frequency-domain representation of the second encoding is performed based on a second bijective mapping, different from the first bijective mapping, from the frequency bins of the frequency-domain representation of the input encoding to the second subset;

generating the frequency-domain representation of the third encoding is performed based on the first bijective mapping and a frequency-domain representation of the second input encoding;

generating the frequency-domain representation of the fourth encoding is performed based on the second bijective mapping and the frequency-domain representation of the second input encoding;

filtering the sample based on the first encoding is performed based on the first bijective mapping and the frequency-domain representation of the input encoding;

filtering the sample based on the second encoding is performed based on the second bijective mapping and the frequency-domain representation of the input encoding;

filtering the sample based on the third encoding is performed based on the first bijective mapping and the frequency-domain representation of the second input encoding; and filtering the sample based on the fourth encoding is performed based on the second bijective mapping and the frequency-domain representation of the second input encoding.

14. The method of claim 13, wherein:
the method further comprises:
generating a frequency-domain representation of the sample;
selecting, based on the first bijective mapping, a third subset of the frequency-domain representation of the sample; and
selecting, based on the second bijective mapping, a fourth subset of the frequency-domain representation of the sample;
filtering the sample based on the first encoding comprises calculating a Hadamard product of the third subset and the frequency-domain representation of the input encoding;
filtering the sample based on the second encoding comprises calculating a Hadamard product of the fourth subset and the frequency-domain representation of the input encoding;
filtering the sample based on the third encoding comprises calculating a Hadamard product of the third subset and the frequency-domain representation of the second input encoding; and
filtering the sample based on the fourth encoding comprises calculating a Hadamard product of the fourth subset and the frequency-domain representation of the second input encoding.

15. The method of claim 1, wherein:
the number of frequency bins of non-zero amplitude in the frequency-domain representation of the first encoding is equal to the number of frequency bins of non-zero amplitude in the frequency-domain representation of the second encoding;

filtering the sample based on the first encoding is performed based on the frequency bins of non-zero amplitude in the frequency-domain representation of the first encoding; and filtering the sample based on the second encoding is performed based on the frequency bins of non-zero amplitude in the frequency-domain representation of the second encoding.

16. The method of claim 1, wherein:
the frequency-domain representation of the first encoding comprises a first subset of frequency bins;
generating the frequency-domain representation of the first encoding is performed based on a first bijective mapping from the frequency bins of the frequency-domain representation of the input encoding to the first subset;
the frequency-domain representation of the second encoding comprises a second subset of frequency bins;
generating the frequency-domain representation of the second encoding is performed based on a second bijective mapping, different from the first bijective mapping, from the frequency bins of the frequency-domain representation of the input encoding to the second subset;
filtering the sample based on the first encoding is performed based on the first bijective mapping and the frequency-domain representation of the input encoding; and
filtering the sample based on the second encoding is performed based on the second bijective mapping and the frequency-domain representation of the input encoding.

17. The method of claim 16, wherein:
the method further comprises generating a frequency-domain representation of the sample;
filtering the sample based on the first encoding comprises:
selecting, based on the first bijective mapping, a third subset of the frequency-domain representation of the sample; and
calculating a Hadamard product of the third subset and the frequency-domain representation of the input encoding; and
filtering the sample based on the second encoding comprises:
selecting, based on the second bijective mapping, a fourth subset of the frequency-domain representation of the sample; and
calculating a Hadamard product of the fourth subset and the frequency-domain representation of the input encoding.

18. The method of claim 1, wherein the return signal is received at the optical sensor during the time period.

19. The method of claim 1, wherein:
the first optical output is transmit into the environment by a first laser; and
the second optical output is transmit into the environment by a second laser.

20. The method of claim 19, wherein the optical sensor comprises a photodiode, wherein receiving the return signal comprises receiving the first and second reflections concurrently at the photodiode.

* * * * *